US006788253B1

(12) United States Patent
Calin

(10) Patent No.: US 6,788,253 B1
(45) Date of Patent: Sep. 7, 2004

(54) METHOD AND APPARATUS FOR USE IN IMPROVING ACCURACY IN GEO-LOCATION ESTIMATES

(75) Inventor: Doru Calin, Freehold Borough, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/673,861

(22) Filed: Sep. 29, 2003

(51) Int. Cl.$^7$ ................................................. G01S 3/02
(52) U.S. Cl. ..................... 342/464; 342/463; 342/457; 342/357.14
(58) Field of Search ............................. 342/464, 463, 342/457, 357.14

(56) References Cited

U.S. PATENT DOCUMENTS

| | | | |
|---|---|---|---|
| 5,659,598 A | | 8/1997 | Byrne et al. |
| 5,737,703 A | | 4/1998 | Byrne |
| 5,901,358 A | * | 5/1999 | Petty et al. ............... 455/456.2 |
| 6,490,452 B1 | | 12/2002 | Boscovic et al. |

FOREIGN PATENT DOCUMENTS

| | | |
|---|---|---|
| EP | 0975184 A1 | 1/2000 |
| EP | 1077582 A1 | 2/2001 |
| EP | 1220559 A1 | 7/2002 |
| GB | 2370191 A | 6/2002 |

* cited by examiner

Primary Examiner—Theodore M. Blum

(57) ABSTRACT

A geo-location technique for use in mobile communications networks employs both FDD and Time Division Duplex (TDD) modes of operation, and is applicable when both FDD and TDD systems are jointly deployed or both FDD and TDD modes of a wireless system such as UMTS are jointly activated. It has been determined that the near-far interference can be much easier controlled on purpose in the TDD mode than in the FDD mode thanks to the slotted data transmission nature of a TDD system that permits adjustment of the interference level at the time slot level instead of the frame level. Indeed, in a TDD system, loading and interference levels can be gracefully decreased in a single time slot without harming the ongoing traffic or complicating the power control operations, as would be the situation in a UMTS FDD system via IPDL or similar solutions that require to mute the pilot transmission. The invention applies to both situations whether or not the terminals are equipped with a dual receiver. This is realized by detecting the level of interference in the FDD system and comparing it with a first threshold. If the interference level is greater than the first threshold, operation is switched to the TDD system to perform the geo-location process. Otherwise, the geo-location process is performed in the FDD system. However, when in the FDD system, if the accuracy of the geo-location measurement is not determined to be satisfactory because, e.g., an insufficient number of pilot signals can be measured in a predetermined time interval, the operation is also switched to the TDD system to perform the geo-location process. Then, when in the TDD system, a time slot is selected that has low interference for the purpose of signal measurements. Once the time slot is selected the interference level is reduced by employing a prescribed technique until the interference level is less than a second threshold. Thereafter, the geo-location process is effected in the TDD system.

20 Claims, 9 Drawing Sheets

GENERAL UMTS ARCHITECTURE
PRIOR ART
200

TRANSCEIVER

METHOD AND APPARATUS FOR USE IN IMPROVING ACCURACY IN GEO-LOCATION ESTIMATES

TECHNICAL FIELD

This invention relates to obtaining geo-location estimates and, more particularly, for improving accuracy in obtaining such estimates in mobile communications networks. The invention also relates to combating near-far interference in wireless communication environments.

BACKGROUND OF THE INVENTION

In mobile communications networks, for example, Universal Mobile Telecommunications Systems (UMTS) employing Frequency Division Duplex (FDD), base stations continually broadcast pilot signals that are spread using a known (standardized) pseudo-random sequence. All base stations in a UMTS network use the same pilot signal sequence. However, pilot signal sequences used by base stations are offset from one another in time. UMTS mobile wireless terminals (and wireless terminals in other multiple access systems that may employ Code Division Multiple Access (CDMA) based technologies or other spread spectrum technologies) are capable of measuring the relative phase differences between any two detected pilot signal sequences. This measurement capability provides a mechanism that can be used to help determine the location of a mobile wireless terminal.

Mobile wireless terminal estimates of the relative phase difference of detectable pilot signals are used by the Observed Time Difference of Arrival (OTDOA) geo-location technique outlined in the UMTS system specification (see for example, 3PP TS 25.305 v5.4.0, "Stage 2 functional specification of User Equipment (UE) positioning in UTRAN"). One such prior art system is shown in FIG. 1.

It is noted without further comment that circle 105 is based on the round trip time estimate of a transmission from mobile wireless terminal 101 to serving base station 102 and back; that hyperbola 106 is the OTDOA hyperbola along which a pilot signal phase measurement is constant between serving base station 102 and neighboring base station 104; and that hyperbola 107 is the OTDOA hyperbola along which a pilot signal phase measurement is constant between serving base station 102 and neighboring base station 103.

Pilot signals from at least three different base stations 102, 103 and 104 are required to accurately estimate the position of a mobile wireless terminal 101 using the OTDOA method, or any other geo-location method employing triangulation of pilot signal measurements of the serving base station 102 and neighboring base stations 103 and 104. Because of the interference-limited nature of mobile communications systems and, in particular, CDMA based systems such as UMTS, detecting pilot signals from two or more neighboring base stations is often not possible over a large portion of the coverage area of a cell. It is well known, for example, that due to the near-far effect, when all base stations are transmitting at maximum power, only the pilot signal from the serving base station 102 can be detectable by the mobile wireless terminal 101 over as much as 40% of the cell's coverage area (the region nearest the base station). When only a single base station is detectable in these prior known systems, the error of the geo-location estimate is unacceptably high. This error can cause OTDOA-based algorithms to fail to satisfy the stringent position error requirements outlined by the United States Federal Communications Commission (FCC) in the Phase II of the Enhanced 911 (E911) Mandate for emergency calls (see for example, FCC E911 Calls, www.fcc.gov/911/enhanced):

for network-based solutions: within 100 m for 67% of calls and within 300 m for 95% of calls;

for handset-based solutions: within 50 m for 67% of calls, and within 150 m for 95% of calls.

Visibility of more than one pilot signal is a serious issue, especially in the FDD system of UMTS, from a geo-location perspective. This is because the transmission from the strongest pilot signal, the one creating the near-far interference, the phenomena that does not allow to measure other pilots, is continuous.

For clarity of this invention, the global interference level at a mobile wireless terminal in a wireless communication environment is generated by all non-desired signals that generate activity, voluntarily or involuntarily, on the same bandwidth with the signal coming from the desired communication unit. Referring to the scenario addressed by this invention, the desired signal to the mobile wireless terminal is (are) the one (those) coming from the serving base station(s). Note than in CDMA, the soft handover feature allows the mobile wireless terminal to communicate with more than one base station simultaneously, thus mobile wireless terminal has multiple serving base stations in soft handover scenarios. The non-desired signals are those signals coming from other base stations that are not serving the mobile wireless terminal. Due to the reuse factor of one (1) often employed by the systems based on spread spectrum technologies such as CDMA, such systems are inherently characterized by both intra-cell interference and inter-cell interference. The intra-cell interference comes from concurrent communications that are active on the cell area covered by the serving base station(s). The inter-cell interference comes from concurrent communications that are active on neighboring cells. The effect of intra-cell and inter-cell interference is cumulative, and it is what ultimately the mobile wireless terminal measures in order to monitor the system conditions for quality link control for example. The applicant has observed that there is a link between the global level of interference that is present at the mobile wireless terminal location and the visibility of pilot signals from different base stations at the same mobile wireless terminal location, thus the expected accuracy of the geo-location process. This aspect will be further exploited in this invention It can be shown that the global interference has the highest values when close to the serving base station 102, and not in the region of borders of adjacent cells. Actually, the global interference level decreases when the mobile wireless terminal 101 is moving away from the serving base station(s), e.g., for example base station 102 shown in FIG. 1. The individual contribution of both intra and inter-cell interference to the global interference is that the level of intra-cell interference decreases with the distance from the base station and the behavior of the inter-cell interference is exactly opposite (see for example, D. Calin, "Geo-location Issues and Accuracy Performance in Wireless Networks", invited paper to the ASWN02 (Applications and Services in Wireless Networks) workshop, July 2002, France).

The high level of global interference in the region close to the serving base station makes possible reception from only one pilot signal, the one from the serving base station. The unavailability of other reference, i.e., pilot, signals may affect dramatically the geo-location accuracy. For all the situations where only one pilot signal is available, the mobile wireless terminal can be located anywhere in the serving sector of a cell at a distance given by the round trip delay. This is a problem in any system based on the FDD system of CDMA or any other wireless technology where the transmission of pilot signals is continuous.

The pilot signal visibility depends dramatically on the system loading, and if the system is operated at heavy loading, there is a very high probability to measure only one pilot signal. The near-far interference region is very large in these scenarios and this affects dramatically the mobile positioning accuracy.

One approach to increasing the possibility of mobile terminals detecting two or more pilot signals from neighboring base stations is the introduction of the Idle Period in DownLink (IPDL) feature in the UMTS system specification. IPDL is currently an optional feature of UMTS networks (see the "Stage 2 functional specification of User Equipment (UE) positioning in UTRAN" noted above). The IPDL solution decreases system-wide interference by temporarily switching off the serving pilot signal for a period of time. This solution has significant drawbacks, however. Temporary muting of pilot signals adversely affects the performance of the downlink channel for on-going calls, increasing frame error rates, thus risking to degrade calls quality, which may lead to undesirable call interruptions. Furthermore, implementing IPDL requires architectural changes to the UMTS network and complicates critical functions such as downlink power control.

SUMMARY OF THE INVENTION

Problems and limitations of prior known geo-location arrangements for use in mobile communications networks are overcome, in accordance with the instant invention, by employing both FDD and Time Division Duplex (TDD) modes of operation, and is applicable when both FDD and TDD systems are jointly deployed or both FDD and TDD modes of a wireless system such as UMTS are jointly activated.

Applicant has determined that the near-far interference can be much easier controlled on purpose in the TDD mode than in the FDD mode thanks to the slotted data transmission nature of a TDD system that permits adjustment of the interference level at the time slot level instead of the frame level. Indeed, in a TDD system, loading and interference levels can be gracefully decreased in a single time slot without harming the ongoing traffic or complicating the power control operations, as would be the situation in a UMTS FDD system via IPDL or similar solutions that require to mute the pilot transmission. Applicant's invention applies to both situations whether or not the terminals are equipped with a dual receiver.

This is realized by detecting the level of interference in the FDD system and comparing it with a first threshold. If the interference level is greater than the first threshold, operation is switched to the TDD system to perform the geo-location process. Otherwise, the geo-location process is performed in the FDD system. However, when in the FDD system, if the accuracy of the geo-location measurement is not determined to be satisfactory because, e.g., an insufficient number of pilot signals can be measured in a predetermined time interval, the operation is also switched to the TDD system to perform the geo-location process. Then, when in the TDD system, a time slot is selected that has low interference for the purpose of signal measurements. Once the time slot is selected the interference level is reduced by employing a prescribed technique until the interference level is less than a second threshold. Thereafter, the geo-location process is effected in the TDD system.

DETAILED DESCRIPTION

Figure 2:
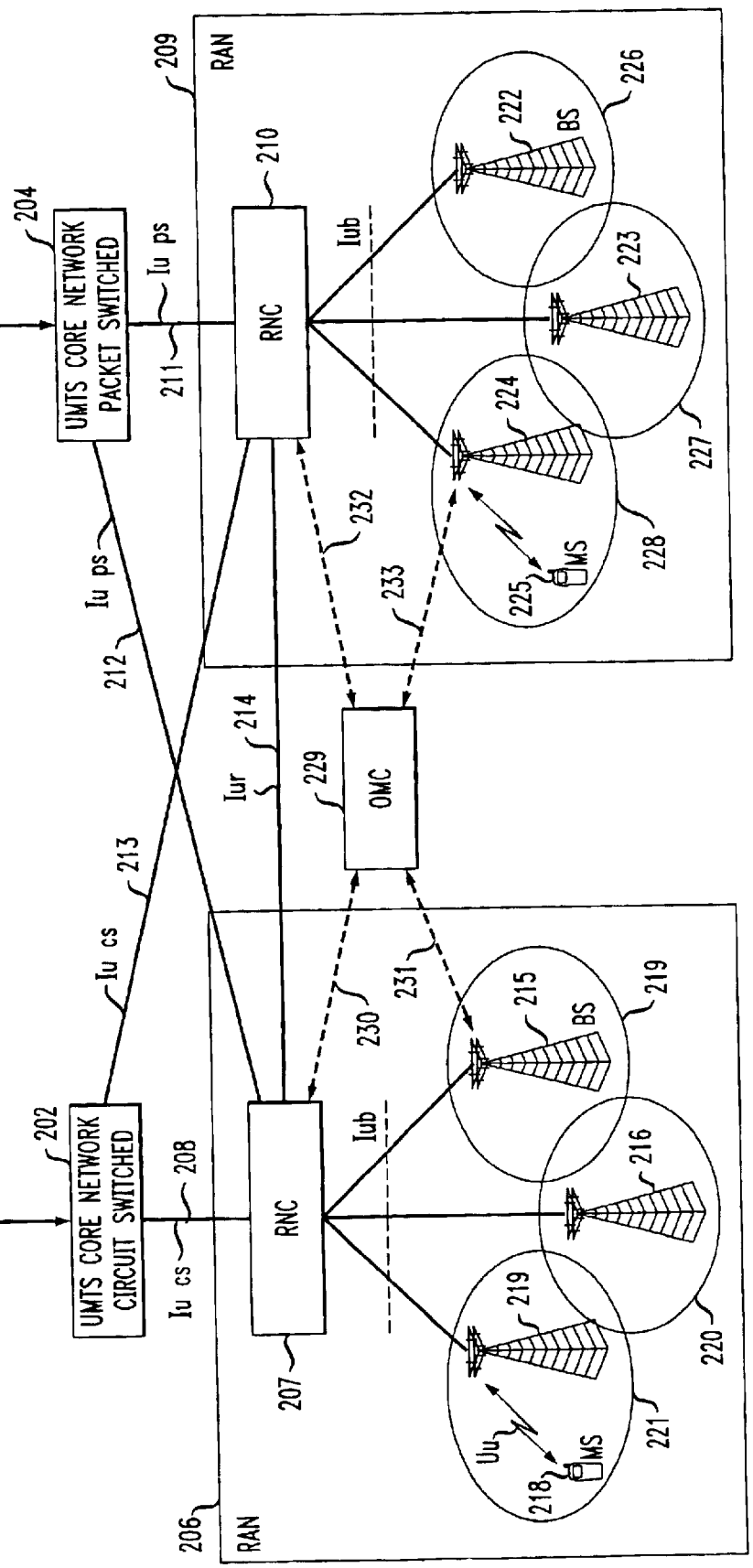
FIG. 2 depicts, in simplified form, details of a mobile communication network in which embodiments of the invention may be employed.

FIG. 2 depicts, in simplified form, details of a mobile communication network 200 in which embodiments of the invention may be employed. The network is a general simplified 3G/UMTS architecture of a type known in the art.

Specifically, shown is external network domain 201, which may be, for example, a Packet Switched Transmission Network (PSTN), the Internet or the like. A first UMTS core network 202, for example, a circuit switched network, is connected to the external network domain 201 by bi-directional transmission path 203. Similarly, a second UMTS core network 204, for example, a packet switched network, is connected to the external network domain 201 by bi-directional transmission path 205. UMTS core network 202 is connected to radio access network (RAN) 206 and therein to radio network controller (RNC) 207 via standard interface (Iu cs) 208. Similarly, UMTS core network 204 is connected to radio access network (RAN) 209 and therein to radio network controller (RNC) 210 via standard interface (Iu ps) 211. UMTS core network 202 is connected to radio network controller (RNC) 210 via standard interface (Iu es) 213. Similarly, UMTS core network 204 is connected to radio network controller (RNC) 207 via standard interface (Iu ps) 212. RNC 207 is connected to RNC 210 via standard interface (Iur) 214. RNC 207 interfaces in a first macro-cell system, i.e., a FDD system, with, for example, base stations 215, 216, and 217, which service cells 219, 220 and 221, respectively, to communicate with mobile wireless stations (MS) like MS 218, in well known fashion. Like wise, RNC 210 interfaces in a second macro-cell system, i.e., FDD system, with, for example, base stations 222, 223, and 224, which service cells 226, 227 and 228, respectively, to communicate with mobile wireless stations (MS) like MS 225, also in well known fashion. Finally, Operations and Management Center (OMC) 229 is interfaced with RNC 207 and a base station such as 215 via transmission paths 230 and 231, respectively. Similarly, OMC 229 is interfaced with RNC 210 and a base stations such as 224 via transmission paths 232 and 233, respectively. Only an OMC control connection with a base station per RAN was shown for illustration purposes, however the OMC has similar control connections with all the other base stations under its supervision. OMC 229 may directly control RNCs 207 and 210, and base stations 215, 216 and 217, and 222, 223 and 224, respectively.

Figure 3:
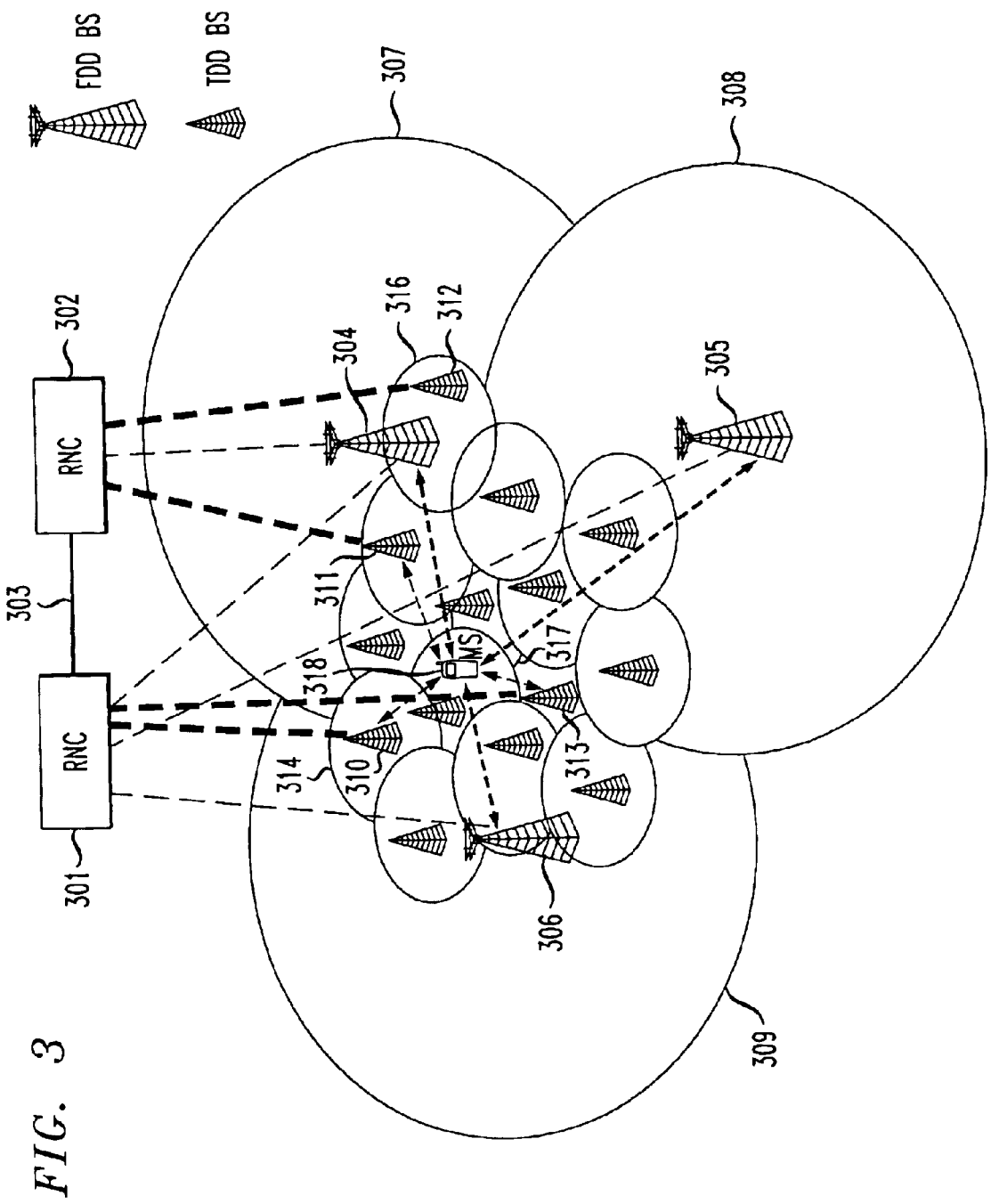
FIG. 3 shows, in simplified form, details of a portion of a mobile communications network including a network configuration in which embodiments of the invention may be employed.

FIG. 3 shows, in simplified form, details of a portion of a mobile communications network 300 including an example network configuration in which embodiments of the invention may be advantageously employed. The RNC 301 and RNC 302 would be included in anetwork similar to that shown in FIG. 2 and described above. It is noted that in another embodiment the RNC 301 and RNC 302 may be completely separated for the macro-cell system, i.e., FDD system and the Micro-cell system, i.e., TDD system for the FDD base stations and the TDD base stations respectively. In this embodiment of the invention, the RNCs may each cover a mixture of the FDD base stations and TDD base stations, which the more likely and is described below.

Thus, shown in FIG. 3 are RNC 301 and RNC 302, interfaced via standard interface 303. RNC 301 and RNC 302 each interface with a mixture of macro-cell base stations and a mixture of micro-cell base stations to communicate with mobile wireless terminal 318. In this example, the macro-cell system operates in FDD and the micro-cell system operates in TDD. For simplicity and clarity of exposition FDD system and TDD system will be used to represent the macro-cell system and the micro-cell system, respectively.

The FDD system base stations include, for example, FDD base stations 304 305 and 306 associated with macro-cells 307, 308 and 309, respectively. The TDD system base stations include among others, for example, TDD base stations 310, 311, 312 and 313 associated with micro-cells 314, 315, 316 and 317, respectively. Mobile wireless terminal 318 is located somewhere in the geographical area shown in FIG. 3 and benefits from both FDD macro-cells coverage and TDD micro-cells coverage. For illustration purposes, FDD base stations 304, 305 and 306, and TDD base stations 310 and 313 are interfaced with RNC 301. Similarly, FDD base station 304, and TDD base stations 311 and 312 are interfaced with RNC 302.

It is noted that FDD base stations and TDD base stations are not typically co-located. In some instances they may be co-located but will not necessarily be both operating simultaneously.

Additionally, in wireless communications systems such as UMTS FDD and UMTS TDD, the mobile wireless terminal performs usually measurements that are required to execute the geo-location determination process. Therefore, the mobile wireless terminal can locate itself or as an alternative can transmit the information to the system via its serving base station(s) and the system can locate it. In both cases, the position of the mobile wireless terminal is determined by using geo-location algorithms such as those known in the art, for example. It should also be noted that satisfactory geo-location accuracy could be more easily obtained in the TDD system because of its Time Slotted structure that allows it to listen to other pilot signals of the system without requiring the interruption of the data transmission. Thus, although the specific example shown in FIG. 3 has been described in terms of the macro-cell system being a FDD system and the micro-cell system being a TDD system other combinations may equally be employed. For example, an embodiment of the invention may include two macro-cell systems, one being a FDD system and the other being a TDD system. Another embodiment of the invention may include two micro cell systems, one being a FDD system and the other being a TDD system. Still another embodiment of the invention, may also include a macro-cell and a micro-cell system in which the macro-cell system is a TDD system and the micro-ell system is a FDD system. Of course, those skilled in the art may employ other than the FDD and TDD systems in yet other embodiment of the invention.

Figure 4:
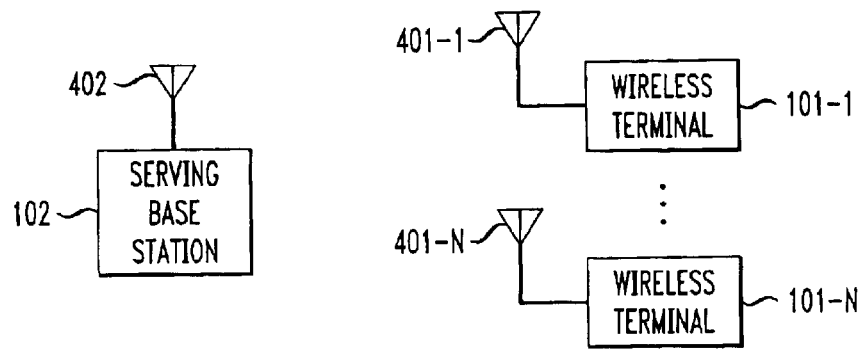
FIG. 4 depicts, in simplified block diagram form, details of a mobile communication network in which embodiments of the invention may be employed.

FIG. 4 shows, in simplified block diagram form, details of a mobile communication system in which embodiments of the invention may be employed. Specifically, shown are one or more mobile wireless terminals 101-1 through 101-N. Each of mobile wireless terminals 101-1 through 101-N transmits and receives signals via an associated antenna 401-1 through 401-N, respectively. The signals are transmitted primarily in a FDD system or when needed in a TDD system from mobile wireless terminals 101-1 through 101-N via antennas 401-1 through 401-N, respectively, to serving base station 102 where they are received by antenna 402. FIG. 4 is a simplified block diagram that captures the fact that the serving base station 102 can be either a FDD base station or a TDD base station, or it can be a common platform that supports the implementation of both FDD and TDD. Signals transmitted from serving base station 102 via antenna 402 are in the FDD system and/or the TDD system, including the required pilot signals that are received at wireless terminals 101-1 through 101-N via associated antennas 401-1 through 401-N, respectively. Again, as will be explained further below, the mobile wireless terminals 101 utilize the received pilot signals from one or more base stations to effect the geo-location process. In one specific example, the signals are UTMS using the CDMA format.

Figure 5:
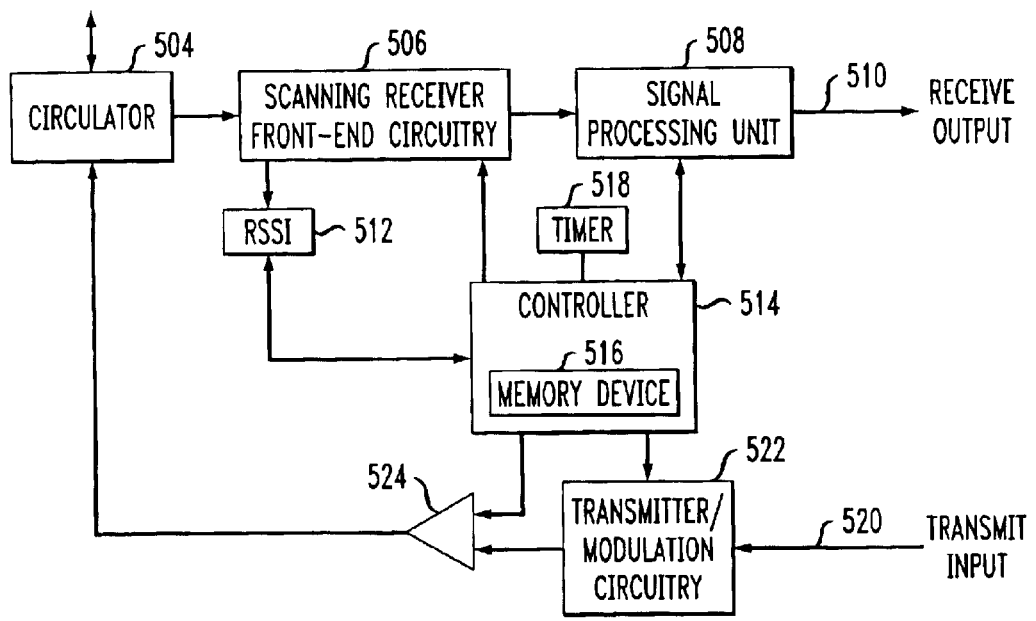
FIG. 5 shows, in simplified block diagram form, details of a transceiver that is employed in mobile wireless terminals 101, and may be employed to support operations in FDD and TDD systems. A similar transceiver may be employed by base station 102.

FIG. 5 shows, in simplified block diagram form, details of a transceiver 500 that may be employed in mobile wireless terminals 101. Particularly, this transceiver may be configured to support operations in FDD and TDD systems and is adapted to support the inventive concepts of the present invention. A similar transceiver may be employed by the base station 102. It is noted that typically the mobile wireless terminal would be equipped with only one such transceiver. In such an instance, the transceiver would have to be switched from the FDD system of operation to the TDD system of operation to make the desired measurements, which would eventually require momentarily interrupting the call, in the absence of data compression capability that is particularly specific to the FDD mode, or in case that temporary muting the serving pilots is not implemented. In the context of this invention, the last may be an option to locate mobile wireless terminals in idle mode (no ongoing calls). The FDD compressed mode and its capability will be discussed in the analysis of FIG. 7. However, for clarity purposes it is worth to mention at this point that the FDD compressed mode is a standardized feature in the 3GPP standard for UMTS Wideband CDMA (WCDMA), which is the FDD mode of UMTS. The compressed mode allows creating discontinuities in data transmission over a FDD system by employing data compression techniques that do not affect the ordinary data flow. Other, mobile wireless terminal may have dual transceivers that would allow the terminal to simultaneously operate in the FDD system and the TDD system. Also note that the FDD and TDD base stations would use different antennas to transmit in the FDD system and the TDD system. The mobile wireless terminal would have just one antenna. Specifically, shown is a block diagram of a transceiver 500 that is adapted to support the inventive concepts of the preferred embodiments of the present invention. The transceiver 500 contains an antenna 502 preferably coupled to a duplex filter or circulator 504 that provides isolation between receive and transmit paths within the transceiver 500. The receiver path, as known in the art, includes scanning receiver front-end circuitry 506 (effectively providing reception, filtering and intermediate or base-band frequency conversion). The scanning front-end circuit is serially coupled to a signal processing function 508. An output from the signal processing function is provided to a suitable output device 510, such as a screen or flat panel display. The receiver chain also includes Received Signal Strength Indicator (RSSI) circuitry 512, which in turn is coupled to a controller 514 for maintaining overall subscriber unit control. The controller 514 is also coupled to the scanning receiver front-end circuitry 506 and the signal processing function 508 (generally realized by a DSP). The controller 514 may therefore receive Bit Error Rate (BER) or Frame Error Rate (FER) data from recovered information. The controller is also coupled to a memory device 516 that stores operating routines, such as decoding/encoding functions, synchronization patterns, code sequences, pilot signal sequences and the like. The memory device 516 stores data relating to neighboring cell sites or systems. Furthermore, a timer 518 is operably coupled to the controller 514 to control the timing of operations (transmission or reception of time-dependent signals) within the transceiver 500, particularly in regard to FDD system, including the FDD compressed mode, and TDD system. As regards the transmit path, this essentially includes an input device 520, such as a keypad, coupled in series through transmitter/modulation circuitry 522 and a power amplifier 524. The transmitter/modulation circuitry 522 and the power amplifier 524 are operationally responsive to the controller. Of course, the various components within the transceiver 500 can be realized in discrete or integrated component form, as well as code in a digital signal processor (DSP) with an ultimate structure therefore being merely an arbitrary selection. The scanning receiver front-end circuitry 506, the transmitter/modulation circuitry 522 and power amplifier 524, under the control and guidance of the signal processing function 508, memory device 516, timer function 518 and controller 514 have been adapted to receive and/or transmit to the infrastructure in the compressed mode of the FDD system. This is performed in response to instruction from the infrastructure to enter such a mode, or as a self-initiated function decided by the controller 514 in response to recognition of the transceivers operating conditions. These receiver elements are also adapted to support operations over the slotted structure that is specific to the TDD systems.

Figure 1:
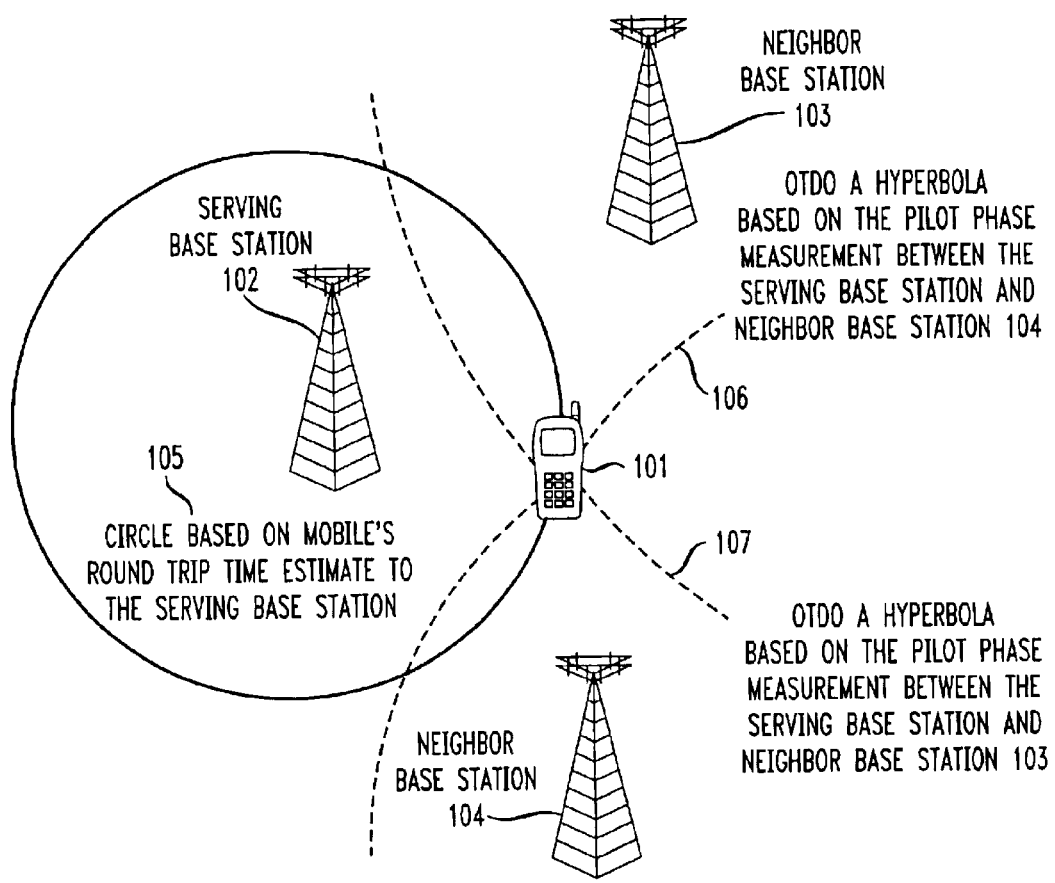
FIG. 1 shows, in simplified form, details of a prior known mobile communications network in which the invention may be employed.
Figure 6:
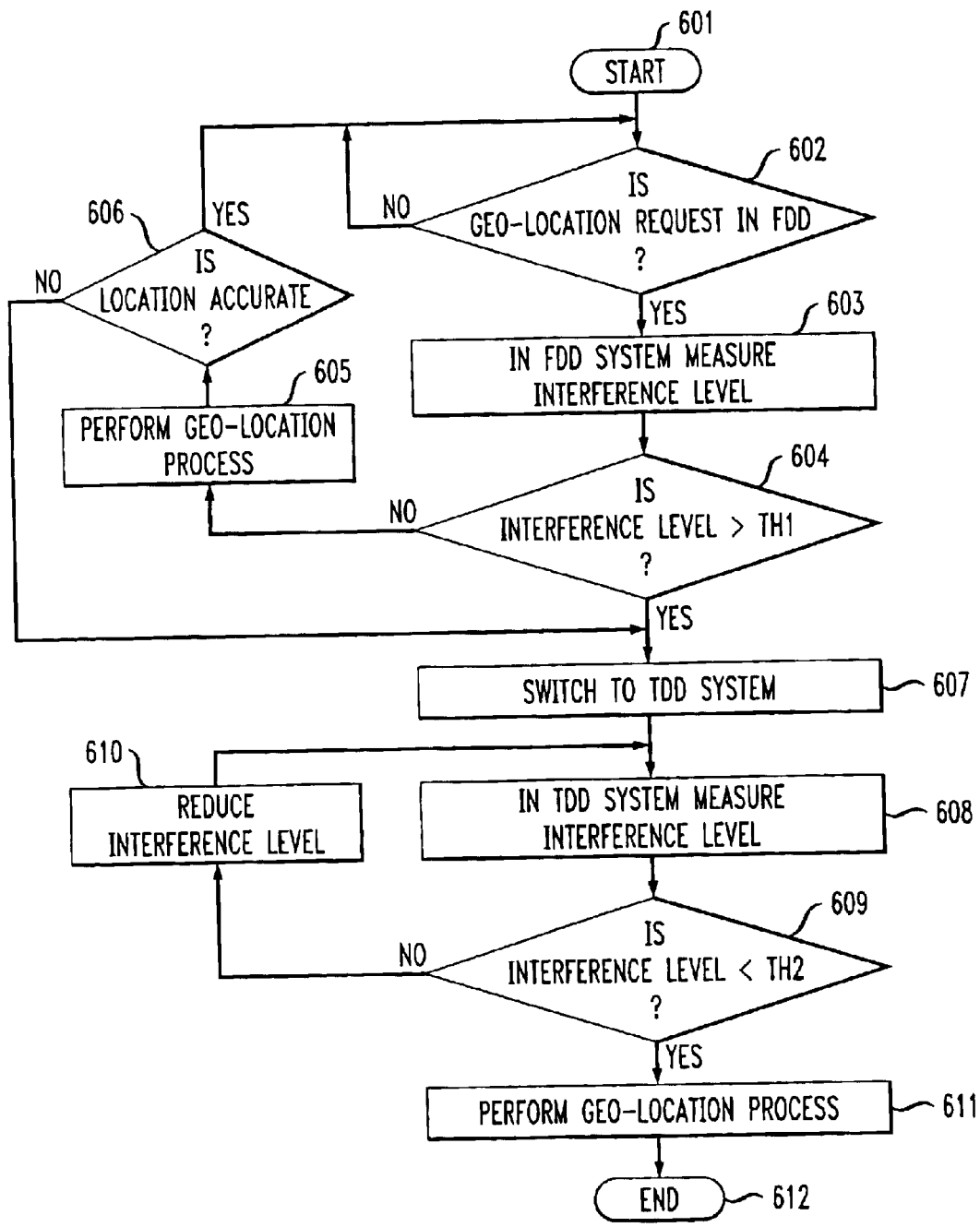
FIG. 6 is a flow chart illustrating steps in performing the geo-location process, in accordance with one embodiment of the invention.

FIG. 6 is a flow chart illustrating steps in performing the geo-location process in accordance with one embodiment of the invention. This addresses the case of a mobile wireless terminal that operates in the FDD system initially. In this embodiment the mobile wireless terminal is equipped with a transceiver capable of supporting operations in FDD mode as well as in TDD mode (similar to that in FIG. 5). The mobile wireless terminal gets instructions to initiate the geo-location process either from the infrastructure via the serving base station(s) or from the controller 514 itself. The role of the infrastructure in initiating the geo-location process may be sought in applications such as mobile wireless terminal location tracking. Alternatively, the mobile wireless terminal may initiate the geo-location process in applications that require to position users equipped with such a terminal, for example in case of emergency calls where user's position must be determined first. The geo-location process will invoke the specific geo-location algorithms that are implemented within the wireless systems where the mobile wireless terminal is operating, e.g., triangulation based algorithms in the first system (FDD system in the preferred embodiment) and triangulation based algorithms in the second system (TDD system in the preferred embodiment). The process is started in step 601. Step 602 then tests if a geo-location request has been received in the FDD system. If the test result is NO, step 602 is repeated until it yields a YES result. Then, in step 603, while in the FDD system, the mobile wireless terminal starts to measure the FDD interference level that is characteristic to the position of the mobile wireless terminal, in a manner well known in the art. The global interference level implication on the visibility of pilot signals from various cell locations and its ultimate impact on the geo-location accuracy has already been discussed on the introductory part of FIG. 1 in this invention. Step 604 tests to determine whether the measured interference level is greater than a first predetermined threshold value, namely, TH1. If the test result in step 604 is NO, the measured interference level is satisfactory. Thereafter, step 605 causes the mobile wireless terminal 101 and therein, an FDD transceiver to perform the geo-location process in the FDD system. Thereafter, step 606 tests to determine whether the resulting location of mobile wireless terminal 101 is accurate. If the test result in step 606 is YES, the geo-location process is successfully completed, causing a transition from step 606 to step 612, which is the END state of the process. If the test result in step 606 yields a NO result, the control is transferred to step 607. Similarly, if the test result in step 606 yields a YES result, the control is transferred to step 607. In step 607, mobile wireless terminal 101 (FIG. 4) is caused to switch from FDD to TDD. This is realized by the transceiver processor being enabled to control a switching unit (not shown) to switch the duplex path from antenna 401 to a TDD transceiver. Thereafter, step 608, in the TDD system, causes the TDD transceiver to make a measurement of the interference level that is characteristic to the position of the mobile wireless terminal, in a manner well known in the art. Then, step 609 tests to determine whether the measured interference level is less than a second threshold level value, namely, TH2. If the test result in step 609 is NO, step 610 causes the TDD transceiver to reduce the interference level. This is effected, in one example, by either interrupting data transmission of some of those calls carried on elected Time Slots if it does not affect their quality of service and/or reallocating resources by moving some calls (transmissions) from the elected Time Slots to other Time Slots to reduce loading and thus interference on the elected Time Slots. Then, control is passed back to step 608 and appropriate ones of steps 608 through 610 are iterated until step 609 yields a YES result. Thereafter, step 611 causes the mobile wireless terminal 101 (FIG. 4) and therein, the TDD transceiver to perform the geo-location process in TDD. Then, the process is ended in step 612.

Figure 7A:
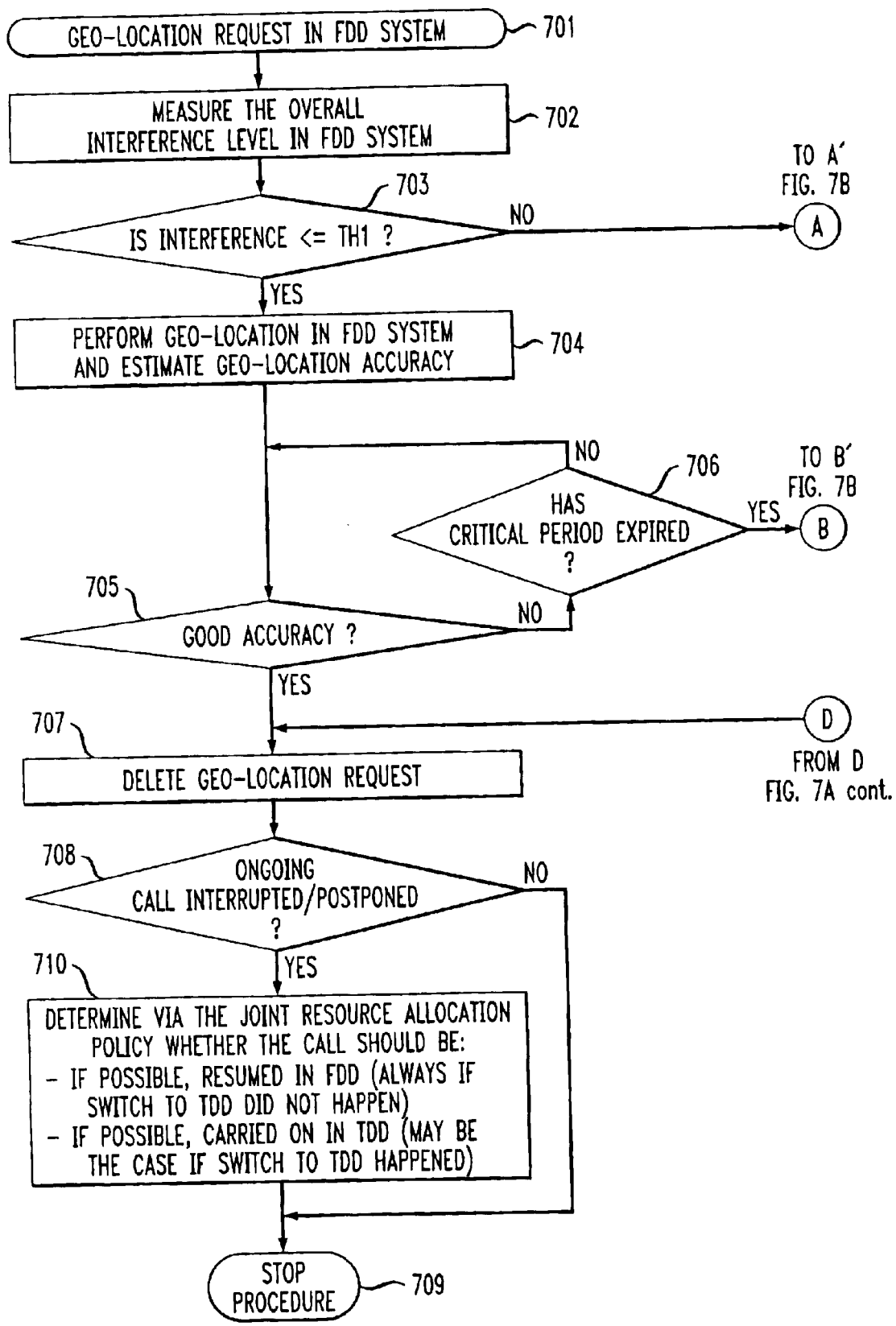
FIGS. 7A and 7B when joined A–A', B–B' C–C' and D—D form a flow chart illustrating steps in a specific embodiment of the invention.
Figure 7A:
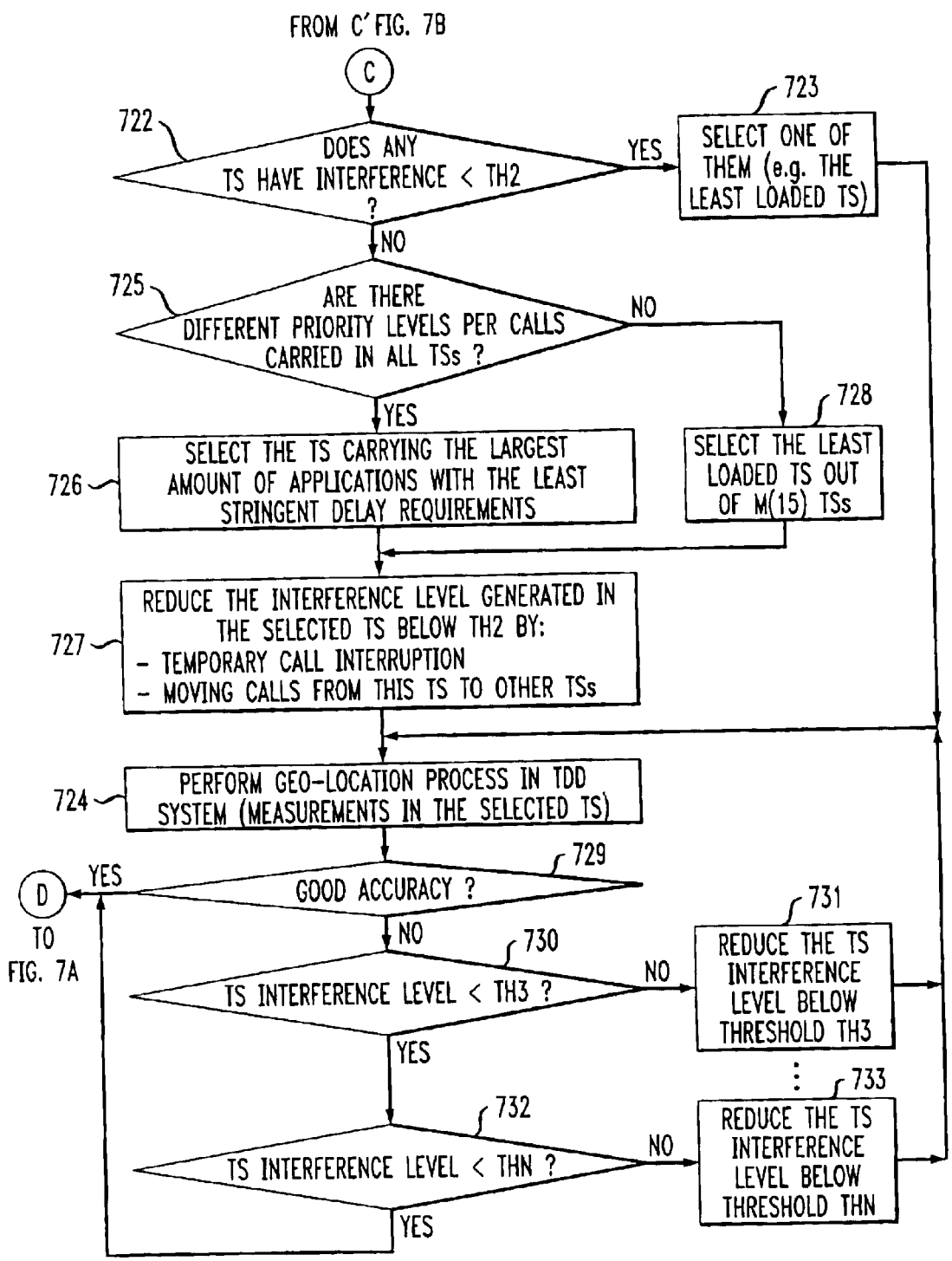
Figure 7B:
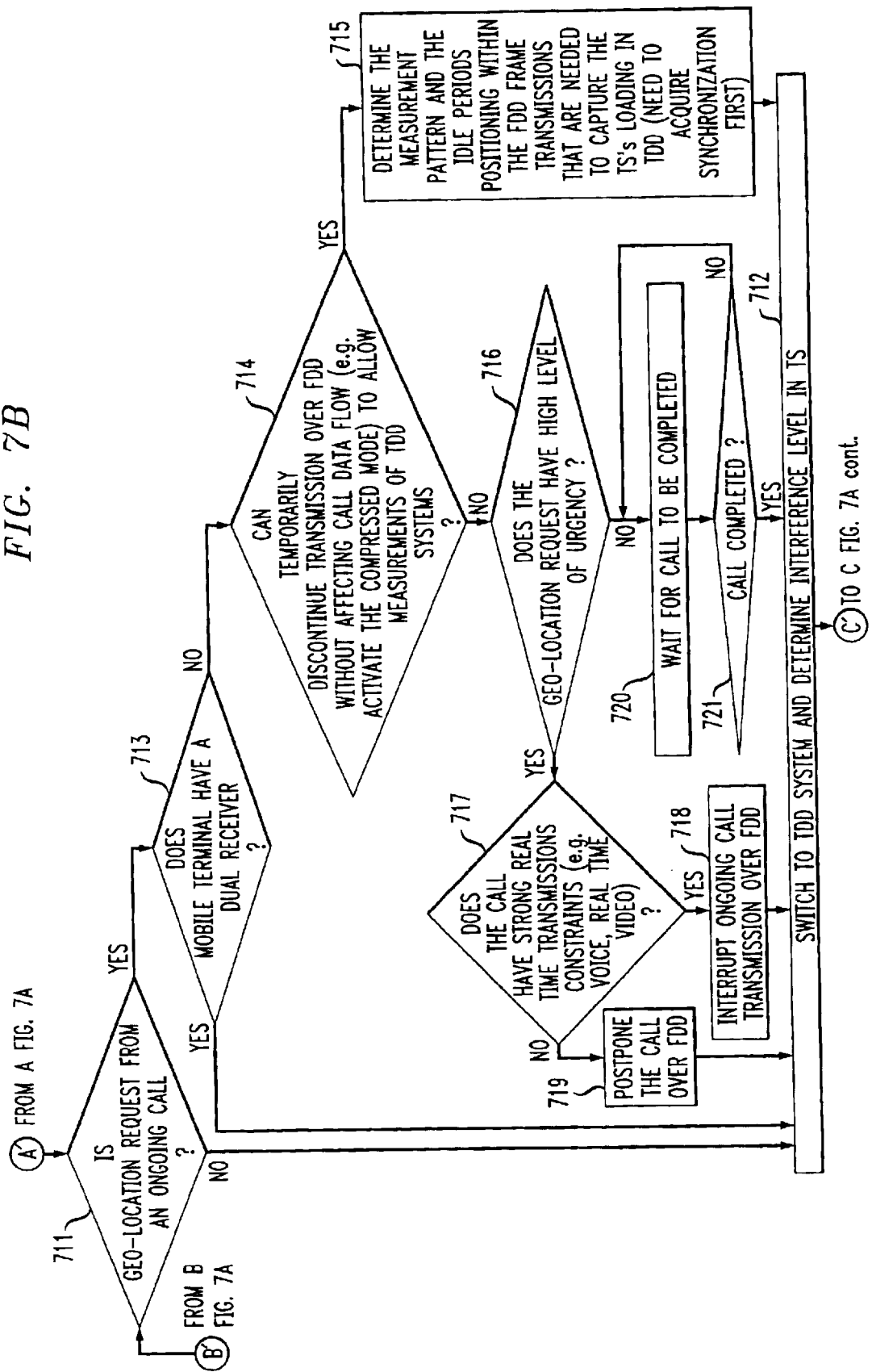

FIGS. 7A, 7A continued and FIG. 7B when connected A–A', B–B', C–C' and D—D form a flow chart illustrating steps in a specific embodiment of the invention. Note that when using the terms "FDD transceiver" or "TDD transceiver" they are not necessarily different transceivers but can be the same transceiver that is operating in the different FDD and TDD systems. In some applications the terminals may be equipped with dual transceivers, or dual receivers at least though. The geo-location process is started by step 701 in response to a geo-location request in the FDD system. Thus, step 702, in the FDD system, causes the FDD transceiver to measure the interference level, at the mobile wireless terminal position in a manner well known in the art. Step 703 tests to determine whether the measured interference level is greater than a first predetermined threshold value, namely, TH1. If the test result in step 703 is YES, the measured interference level is satisfactory to continue the geo-location procedure over the FDD system. We will return to step 703 below. Then, step 704 causes the mobile wireless terminal 101 and therein, the FDD transceiver under control of the processor to perform the geo-location process in the FDD system. At this point one estimates the geo-location accuracy by available methods such as referring to the size of the location area where it is known the mobile wireless terminal is located. The larger this area, the higher the uncertainty of the positioning and thus the poorer the accuracy of the geo-location estimate. Step 705 tests to determine whether the accuracy detected during the geo-location process performed in step 704 is satisfactory. If the test result in step 705 is NO, step 706 tests to determine whether a predetermined time-out interval has expired. If the test result in step 706 is NO, control is returned to step 705 and appropriate ones of steps 705 and 706 are iterated until either step 705 yields a YES result, indicating satisfactory accuracy or step 706 yields a YES result, indicating that the predetermined timing interval has expired, but that the accuracy of the geo-location estimates was not satisfactory. We will return to step 706 below. When step 705 yields the YES result indicating that the geo-location measurement is sufficiently accurate, control is passed to step 707. Step 707 causes the geo-location request to be deleted. Thus, the test has been completed in the FDD system for the mobile wireless terminal 101.

Thereafter, step 708 tests to determine whether the ongoing call has been interrupted or postponed. If the test result in step 708 is NO, step 709 stops the process. If the test result in step 708 is YES, the ongoing call has been interrupted or postponed. Then, step 710 determines via a joint resource allocation policy for the FDD and TTD systems operation whether the ongoing call should be resumed in the FDD system (always if switched to the TDD system was not made), or if possible carried on in the TDD system (may happen if switching to the TDD system had occurred). Then, control is returned to step 709 that stops the process, as indicated above.

Returning now to step 703, if the test result indicates that the interference level is greater than TH1 the test result is NO and control is transferred to step 711. Similarly, returning to step 706 and the predetermined time-out interval has expired the test result is YES, thereby indicating that there was not satisfactory geo-location accuracy detected during the geo-location process performed over the FDD system, and control is also transferred to step 711. Step 711 tests to determine whether the geo-location request is from an ongoing call. If the test result is NO, control is transferred to step 712. Then, step 712 causes the mobile wireless terminal to switch from the FDD system to the TDD system, and to determine the interference level in all Time Slots (TSs) or only some specific Time Slots of the TDD frame, depending on the particular embodiment of the invention being used. Note that since the mobile wireless terminal did not carry on an ongoing call, the mobile wireless terminal was in idle mode. If the test result in step 711 is YES, step 713 tests to determine if the mobile wireless terminal has a dual receiver. If the test result in step 713 is YES, control is transferred to step 712. Then, one transceiver can continue to carry on the ongoing call over the FDD system while the second transceiver is making measurements and covers all the geo-location process over the TDD system in parallel. If the test result in step 713 is NO, step 714 tests to determine whether transmission over the FDD system can be temporarily discontinued without affecting call data flow, e.g., by activating a so-called compression mode of FDD system operation, to allow measurements to be made of TDD systems. Note that the test result in step 713 being NO, indicates that the mobile wireless terminal is equipped with a single receiver, so there is no way to carry on the call and do inter-system measurements (measure TDD signals) at the same time while maintaining the continuous transmission over the FDD system (see 801, FIG. 8), or any frequency duplex system where the data transmission is continued during the active call (because one needs some idle periods (see 803, FIG. 8) on the transmission to be able to get measurements from other systems). If the test result in step 714 is YES, step 715 determines the measurement pattern, and the idle periods positioning within the FDD frame transmissions (see 803, FIG. 8) that are needed to capture the Time Slots (TSs) loading in the TDD system. Note that prior to effecting step 715 synchronization must be acquired first. In addition, step 715 represents the instance when data transmission over the FDD system can be temporarily discontinued without affecting the overall call data flow. This means that the same quantity of information is sent over a frame while idle periods 803 (FIG. 8) within the frame are created—this is possible by transmitting at twice the rate for half the time of a frame and by creating a half-a frame idle period, for example. Moreover, these 803 (FIG. 8) idle periods can be created both at the end and at the beginning of a frame; hence by concatenating two consecutive frames (see FIG. 8) one can obtain up to a frame, i.e., 10 ms of idle frame to take measurements from the TDD system. This guarantees that the synchronization channels of the TDD system will be captured, as the TDD frame is also 10 ms—thus it works also in case the two systems, FDD and TDD are not synchronized. In the TDD system the mobile wireless terminal is in charge of performing measurements and reporting back to the base stations. According to the 3GPP standard specifications, the interference level in the Time Slots is determined by measuring the Interference Signal Code Power (ISCP) of codes that are specified by the network through the broadcast channel (BCH). Note that in TDD systems, radio channels are created using codes that have orthogonal property and that are transmitted in a Time Slot.15 Time Slots are available in a TDD radio frame, the same as in the FDD system, but the data transmission per Time Slot is limited in time to the Time Slot, e.g. $\frac{1}{15}$ of a 10 ms frame only. High data rate calls may have assigned multiple slots and/or multiple codes during a frame. Up to 16 codes may be mapped on a single Time Slot and they may belong to different calls/connections. Thus, when step 714 yields a YES result, as indicated above, the process must determine the measurement pattern and how the idle periods 803 (FIG. 8) are created within the FDD frame to measure the interference level of the TSs of the TDD system. In an embodiment of the invention, all the Time Slots should be monitored, in another embodiment of the invention only a portion of all the 15 Time Slots may need to be monitored. The specific embodiment of the invention must be known in order to calibrate the duration of the idle period 803 (and its pattern). The pattern refers to if and when the idle periods must be repeated (again see 803, FIG. 8 for idle periods in the compression mode). Thereafter, control is transferred to step 712. If the test result in step 714 is NO, which may imply that the data compression is either not supported or does not work properly for the calls associated with the geo-location request, step 516 tests to determine whether the geo-location request has a high priority, i.e., a high level of urgency. If the test result in step 716 is YES, step 717 tests to determine whether the current call has "strong" real time transmission constraints, e.g., voice, real time video or the like. If the test result in step 717 is YES, step 718 causes interruption of the ongoing call transmissions over FDD. Thereafter, control is passed to step 712. If the test result in step 717 is NO, the action is to postpone the ongoing call over the: FDD system until the geo-location process is successfully completed. Then, control is passed to step 712 to continue the geo-location process over the TDD system. For clarification purposes, the invention makes a clear distinction between call interruption and call postponing. Call interruption means that the call needs to be completely stopped, essentially because its constraints such as real time constraints for example cannot be fulfilled. Call postponing may be equivalent to putting the call on hold, which may be typical for data transmission that does not have stringent time delivery requirements. If the test result in step 716 is NO, step 720 causes the geo-location process to wait until the current call has been completed, i.e., terminated. Call completion is tested at step 721. If the test result in step 721 is NO, control is returned to step 720 and steps 720 and 721 are iterated until step 721 yields a YES result. Then, control is passed to step 712. As indicated above, step 712 causes the switching from the FDD system to the TDD system, and to determine the interference level in the particular TSs that have been selected. As indicated above, when in the TDD system, in a particular embodiment of the invention, all the Time Slots (15 in UMTS TDD) may be scanned. In another embodiment of the invention, only a part of these Time Slots may be scanned for geo-location purposes. The tradeoff is the time required to process these measurements versus the efficiency of the procedure, though enough accuracy may be obtained in TDD with a small number of Time Slots, even one Time Slot would suffice if the interference level can be kept low enough to allow good quality measurements.

Returning now to step 706, if the test result is YES, control is passed to step 711 (FIG. 7B) and appropriate ones of steps 711 through step 721 are executed, as described above. After step 712 has been executed, control is passed to step 722 (FIG. 7A). The mobile wireless terminal is taking signal measurements from the TDD system, tests to determine whether any Time Slot (TS) has an interference level less than a predetermined second threshold level, namely, TH2. Typically, interference level threshold value TH2 is set to a value such as to guarantee a high probability of geo-location accuracy in the TDD system. However, if the Time Slots interference level is estimated too high, the interference level can be further decreased to guarantee better geo-location accuracy, as described below, in accordance with an aspect of the invention. If the test result in step 722 is YES, the selected Time Slots interference levels are considered satisfactory and step 723 selects one of these Time Slots to perform the geo-location process in. For accuracy purposes, the selected Time Slot should be the one that has the least interference, for example, the Time Slot having the lowest loading level. Then, step 724 performs the geo-location process in the TDD system by making the appropriate measurements is the selected Time Slot, in a manner well known in the art, e.g., by applying triangulation or other known geo-location techniques.

Returning to step 722, if the test result is NO, indicating that the interference level is too high to guarantee acceptable geo-location accuracy, i.e., greater than threshold TH2, step 725 tests to determine whether there are different priority levels for calls carried in all the Time Slots. If the test result in step 725 is YES, step 726 selects the Time Slot transporting the largest number of applications with, for example, the less stringent delay requirements, and control is passed to step 727. Returning to step 725, if the test result is NO, all the calls have the same priority, and step 728 selects the Time Slot transporting the least loaded Time Slot out of a predetermined number, M, of Time Slots, in this example M=15 Time Slots in one TDD frame, and control is also passed to step 727. Step 727 causes the interference level in the selected Time Slot to be reduced, in accordance with prescribed criteria and an aspect of the invention, below threshold level TH2. In this example, the interference level in the Time Slot is reduced by either, temporarily interrupting the ongoing call and/or moving calls from the selected Time Slot, to other Time Slots in the TDD frame. Then, control is passed to step 724, which as explained above, performs geo-location measurements in the selected Time Slot determined in one of the steps 723, 728 or 726. Thereafter, step 729 tests to determine whether there is good geo-location accuracy in the selected Time Slot. If the test result is YES, control is passed back to step 707 and the process proceeds as described above. If the test result in step 729 is NO, the accuracy is not satisfactory and step 730 tests to determine whether the interference in the Time Slot (TS) is less than a third predetermined threshold level, namely, TH3. If the test result in step 730 is NO, step 731 causes the interference level in the selected Time Slot to be further reduced below the threshold level TH3. Then, control is passed back to step 724 to perform the geo-location process again to obtain the location of mobile wireless terminal. The reduction in interference in step 731 is achieved in the same manner as that obtained in step 727, described above. Then, if the test result in step 729 is YES, control is passed to step 707 and the process continues. Returning to step 729, if the test result is NO, the accuracy is still not good enough and step 730 again tests to determine whether the interference level in the selected Time Slot is less than TH3. The test result in step 730 should now be YES, since in the prior iteration step 731 reduced the interference to be less than threshold TH3 and loading variations that could be generated during the execution of steps 724 and steps 729 are expected to be insignificant. This is because either the execution time to complete these two steps is fast or because in one embodiment of the invention, the loading control algorithm may keep the loading and, consequently, the interference on the selected TS below the threshold that has already been set, TH3 in this circumstance. Then, control is passed to a next step for testing the level of the interference against another threshold level, and possibly to a step for reducing the interference level below the next threshold level and repeating steps 724, 729, 730 and the next threshold comparison step until a predetermined number N of threshold interference comparison steps is performed or step 729 yields a YES result at a prior one of the comparison steps. The number of N steps of possible comparison step is left to the implementer. As indicated above, steps 707, 708 and eventually 710—if the ongoing call (supported by the mobile wireless terminal involved in the geo-location) was temporarily interrupted or postponed—will be executed to reach step 709 that stops the process.

Figure 8:
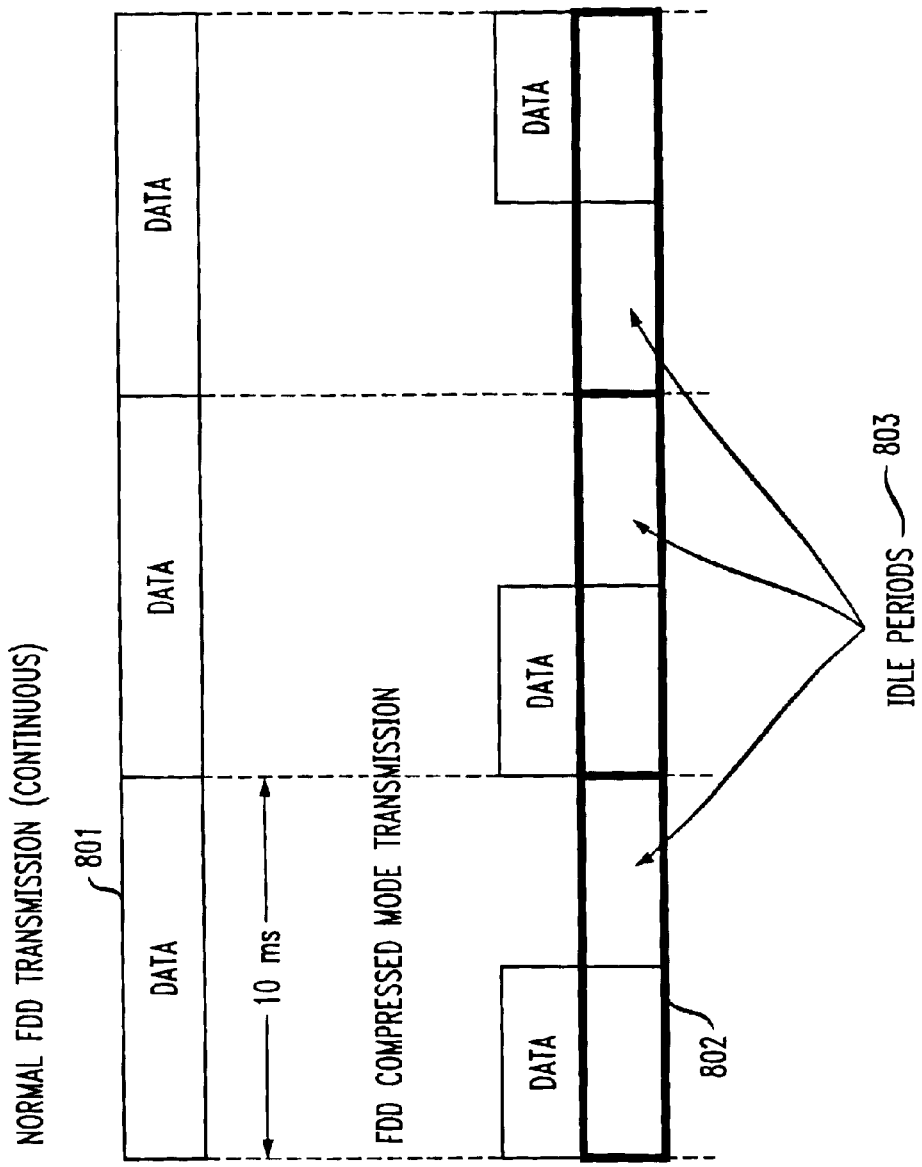
FIG. 8 is a timing diagram showing the normal FDD transmission and a compressed FDD transmission.

FIG. 8 is a timing diagram showing the normal FDD system of transmission 801 and a compressed FDD system of transmission 802. Note that in the normal FDD system of transmission 801, the transmission is continuous. In the compression mode of FDD transmission 802, there are idle intervals 803 in the transmission that are usually determined by a predetermined measurement pattern for a FDD system.

These idle intervals 803 are advantageously used during the geo-location process, as described above. The idel periods can be of different sizes, depending on the data compression capability and data compression requirements.

It should be noted that there are tradeoffs in setting the threshold levels. The lower the threshold level is, the better the accuracy is, but more channel allocations and/or temporary call interruptions are necessary. Since the interference level is highly dependent on the position of the mobile wireless terminal in the cell area serviced by the serving base station, it is desirable to have multiple testing threshold levels so as not to trigger excessive channel reallocations when not necessary. To guarantee an acceptable accuracy performance with, for example, a single threshold level, the threshold level should be set at a level with respect to the worst case expected to be encountered. Unfortunately, such a setting would cause a large number of unnecessary channel reallocations, requiring additional signaling to be transported and further degradation of in spectrum efficiency.

It will be appreciated by those skilled in the art that they will be able to devise various arrangements and processes, which although not explicitly shown or described herein, embody the principles of the invention and, thus, are within its spirit and scope.

Of course, the various components within the base station and the wireless terminals can be realized in discrete or integrated component form, as well as code in a microcomputer, Digital Signal Processor (DSP) or the like, with an ultimate structure therefore being merely an arbitrary selection.

What is claimed is:

1. A method for use in a geo-location system of a mobile wireless communication network, the network including at least one mobile wireless terminal and at least one base station, the mobile wireless terminal having at least one transceiver capable of operating in a first operational system and an at least second operational system, said operational systems including pilot signals transmitted along with signals transmitted in the first and at least second operational systems by said at least one base station, the method comprising the steps of:

measuring a first interference level in said first operational system;

comparing said measured first interference level to a first threshold level;

if said first measured interference level is equal to or less than said measured first threshold level, performing a geo-location process in said first operational system to obtain a location of said at least one mobile wireless terminal;

if said measured first interference level is greater than said first threshold level, switching in accordance with first prescribed criteria to said at least second operational system;

measuring a second interference level in said at least second operational system;

comparing said measured second interference level to a second threshold level;

if said measured second interference level is equal to or greater than said second threshold level, reducing said interference level utilizing second prescribed criteria until said measured second interference level is less than said second threshold level; and performing said geo-location process in said second operational system to obtain a location of said at least one mobile wireless terminal.

2. The method as defined in claim 1 wherein one of said operational systems is a Frequency Division Duplex (FDD) system and the other of said operational systems is a Time Division Duplex (TDD) system.

3. The method as defined in claim 2 wherein said TDD system includes TDD frames each having a predetermined number of time slots and further including the steps of selecting a set of said time slots in said TDD frames, measuring interference levels in each time slot in said set, comparing said interference levels of said time slots to said second threshold level to determine which of said time slots has an interference level less than said second threshold level, if one or more time slots has an interference level less than said second threshold level, selecting one of said time slots in accordance with third prescribed criteria, and performing said geo-location process on said selected time slot to determine the location of said mobile wireless terminal.

4. The method as defined in claim 2 wherein said TDD system includes TDD frames each having a predetermined number of time slots and further including the steps of, measuring interference levels in each time slot in said TDD frames, comparing said interference levels of said time slots to said second threshold level to determine which of said time slots has an interference level less than said second threshold level, if none of said time slots has an interference level less than said second threshold level, selecting one of said time slots in accordance with fourth prescribed criteria, and performing said geo-location process on said selected time slot to determine the location of said mobile wireless terminal.

5. The method as defined in claim 4 wherein said fourth prescribed criteria includes determining whether there are different priority levels for calls being transported by said time slots, if there are no different priority levels, selecting a time slot transporting the least load from a predetermined number of time slots.

6. The method as defined in claim 5 further including the steps of, if said step of determining indicates that there are different priority levels for calls transported in all of said time slots, selecting the time slot transporting the largest application load with the least stringent delay requirements, and reducing the interference level in said selected time slot.

7. The method as defined in claim 6 wherein said interference is reduced in said selected time slot by temporally interrupting a call being transported in said selected time slot and/or moving one or more calls from the selected time slot to others of said time slots.

8. The method as defined in claim 7 further including the steps of (a) determining whether the obtained geo-location position of the mobile wireless terminal has satisfactory accuracy, (b) if said obtained geo-location position does not have satisfactory accuracy, (c) comparing the interference level of said selected time slot to at least another predetermined threshold level to determine if said interference level of the selected time slot is less than said at least another predetermined threshold level, (d) if the interference level in said selected time slot is equal to or greater than said at least another predetermined threshold level, (e) reducing the interference level in said selected time slot to less than said at least another predetermined threshold value, (f) again performing said geo-location process of said selected time slot, and iterating appropriate ones of said steps (a) through (f) until a current interference level of step (e) has been compared to all of said at least another predetermined threshold levels and the interference level of said selected time slot is less then a last one of said at least another predetermined threshold level.

9. The method as defined in claim 2 wherein said first criteria includes the steps of, if said interference measured in said first operational system is greater than said first threshold level, determining if said geo-location request is from an ongoing call, if said geo-location request is not from an ongoing call switching to said second operational system.

10. The method as defined in claim 9 wherein said first operational system is said FDD system and said second operational system is said TDD system, and said first criteria further includes the steps of, if said geo-location request is from an ongoing call, determining whether said mobile wireless terminal has a dual transceiver, if said mobile wireless terminal has a dual transceiver, switching to said second operational system.

11. The method as defined in claim 9 wherein said first operational system is said FDD system and said second operational system is said TDD system, and said first criteria further includes the steps of, if said geo-location request is from an ongoing call, determining whether said mobile wireless terminal has a dual transceiver, if said mobile wireless terminal does not have a dual transceiver, determining whether transmission can be temporarily discontinued over said FDD system without affecting call data flow to allow measurements on TDD systems, if said transmission over said FDD system can be temporarily discontinued, determining the interference measurement pattern and idle period positioning within FDD system frame transmissions and switching from said FDD system to said TDD system.

12. The method as defined in claim 9 wherein said first operational system is said FDD system and said second operational system is said TDD system, and said first criteria further includes the steps of, if said geo-location request is from an ongoing call, determining whether said mobile wireless terminal has a dual transceiver, if said mobile wireless terminal does not have a dual transceiver, determining whether transmission can be temporarily be discontinued over said FDD system without affecting call data flow to allow measurements on TDD systems, if said transmission over said FDD system can not be temporarily discontinued, determining whether said geo-location request has a high level of urgency, if said geo-location request does not have a high level of urgency, determining whether said call has been completed, upon it being determined that said call has been completed, switching from said FDD system to said TDD system.

13. The method as defined in claim 9 wherein said first operational system is said FDD system and said second operational system is said TDD system, and said first criteria further includes the steps of, if said geo-location request is from an ongoing call, determining whether said mobile wireless terminal has a dual transceiver, if said mobile wireless terminal does not have a dual transceiver, determining whether transmission can be temporarily be discontinued over said FDD system without affecting call data flow to allow measurements on TDD systems, if said transmission over said FDD system can not be temporarily discontinued, determining whether said geo-location request has a high level of urgency, if said geo-location request does have a high level of urgency, determining whether said call has strong real time transmissions restraints, if said call has strong real time transmissions restraints, interrupting said call transmission over said FDD system and switching from said FDD system to said TDD system.

14. The method as defined in claim 9 wherein said first operational system is said FDD system and said second operational system is said TDD system, and said first criteria further includes the steps of, if said geo-location request is from an ongoing call, determining whether said mobile wireless terminal has a dual transceiver, if said mobile wireless terminal does not have a dual transceiver, determining whether transmission can be temporarily be discontinued over said FDD system without affecting call data flow to allow measurements on TDD systems, if said transmission over said FDD system can not be temporarily discontinued, determining whether said geo-location request has a high level of urgency, if said geo-location request does have a high level of urgency, determining whether said call has strong real time transmissions restraints, if said call does not have strong real time transmissions restraints, postponing said call transmission over said FDD system and switching from said FDD system to said TDD system.

15. The method as defined in claim 2 wherein said first operational system is said FDD system and said second operational system is said TDD system, and said first criteria includes the steps of, if said interference measured in said first operational system is equal to or less than said first threshold level, performing said geo-location process in said FDD system, (a') determining whether the resulting geo-location has satisfactory accuracy, (b') if said geo-location accuracy is not satisfactory, setting a timer having a critical period, (c') determining whether said critical period has expired, if said critical period has not expired repeating steps (a') through (c') until either said accuracy is satisfactory or said critical period has expired.

16. The method as defined in claim 15 further including the steps of, if said accuracy is satisfactory, deleting said geo-location request, determining whether the said call was interrupted or postponed, if said call was not interrupted or postponed, stopping said geo-location procedure, if said call was interrupted or postponed, determining whether said call should be if, possible, resumed in the FDD system or carried on in the TDD system and thereafter stopping said geo-location procedure.

17. The method as defined in claim 15 further including the steps of, if said critical time period has expired, determining if said geo-location request is from an ongoing call, if said geo-location request is not from an ongoing call switching to said TDD system, if said geo-location request is from an ongoing call, determining whether said mobile wireless terminal has a dual transceiver, and if said mobile wireless terminal has a dual transceiver, switching to said TDD system.

18. Apparatus for a mobile wireless terminal associated with a wireless communications network in which geo-location positions of the mobile wireless terminal can be made, the network including at least one of the mobile wireless terminals and at least one base station, the mobile wireless terminal having at least one transceiver capable of operating in a first operational system and an at least second operational system, said operational systems including pilot signals transmitted along with signals transmitted in the first and at least second operational systems by said at least one base station, the apparatus comprising:

measurement equipment to measure a first interference level in said first operational system;

a comparator to compare said measured first interference level to a first threshold level;

a processor responsive to a result from said comparator indicating said first measured interference level is equal to or less than said measured first threshold level, to effect a geo-location process in said first operational system to obtain a location of said at least one mobile wireless terminal;

a controllable switch, responsive to said result from said comparator indicating said measured first interference level is greater than said first threshold level, to switch in accordance with first prescribed criteria from said first operational system to said at least second operational system;

said measurement equipment being controlled to measure a second interference level in said at least second operational system;

said comparator being controlled to compare said measured second interference level to a second threshold level;

an interference reduction unit responsive to said measured second interference level being equal to or greater than said second threshold level, to reduce said interference level utilizing second prescribed criteria until said measured second interference level is less than said second threshold level; and said processor being controlled to effect said geo-location process in said second operational system to obtain a location of said at least one mobile wireless terminal.

19. The apparatus as defined in claim 18 wherein one of said operational systems is a Frequency Division Duplex (FDD) system and the other of said operational systems is a Time Division Duplex (TDD) system.

20. The apparatus as defined in claim 19 wherein said TDD system includes TDD frames each having a predetermined number of time slots and further including the a selector to select a set of said time slots in said TDD frames, said measurement equipment measuring interference levels in each time slot in said set, a comparator to compare said interference levels of said time slots to said second threshold level to determine which of said time slots has an interference level less than said second threshold level, said selector being responsive to one or more time slots having an interference level less than said second threshold level, to select one of said time slots in accordance with third prescribed criteria, and said processor causing the performance of said geo-location process on said selected time slot to determine the location of said mobile wireless terminal.

* * * * *